(12) United States Patent
El Ghannam et al.

(10) Patent No.: US 10,640,222 B2
(45) Date of Patent: May 5, 2020

(54) TURBINE ENGINE HAVING HORIZONTALLY OFFSET AXES

(71) Applicant: SAFRAN AIRCRAFT ENGINES, Paris (FR)

(72) Inventors: Nora El Ghannam, Melun (FR); Matthieu Etienne Attali, Paris (FR); Romain Jean-Claude Ferrier, Brunoy (FR); Caroline Marie Frantz, Brie Comte Robert (FR); Thomas Gerard Daniel Riviere, Noise-le-Grand (FR); Nicolas Xavier Trappier, Maisons Alfort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 158 days.

(21) Appl. No.: 15/729,504

(22) Filed: Oct. 10, 2017

(65) Prior Publication Data
US 2018/0105278 A1      Apr. 19, 2018

(30) Foreign Application Priority Data
Oct. 14, 2016   (FR) ..................................... 16 59953

(51) Int. Cl.
  *B64D 27/26*    (2006.01)
  *F02C 6/20*     (2006.01)
  (Continued)

(52) U.S. Cl.
  CPC ............. *B64D 27/26* (2013.01); *B64D 27/12* (2013.01); *B64D 29/08* (2013.01); *F02C 6/206* (2013.01);
  (Continued)

(58) Field of Classification Search
  CPC ........ B64D 27/26; B64D 27/12; B64D 29/08; B64D 2027/264; F02C 7/20; F02C 7/32;
  (Continued)

(56) References Cited

U.S. PATENT DOCUMENTS 2,601,194 A * 6/1952 Whittle ..................... F02K 3/12
                                                    60/226.1
3,121,526 A * 2/1964 Morley ................... F02C 3/107
                                                    415/122.1
(Continued)

OTHER PUBLICATIONS

Search Report and Written Opinion in French Application No. 1659953 dated Jun. 1, 2017, with English translation coversheet.

*Primary Examiner* — Sizo B Vilakazi
(74) *Attorney, Agent, or Firm* — Womble Bond Dickinson (US) LLP

(57) ABSTRACT

The invention relates to an aircraft propulsion assembly comprising a cradle receiving a turbine engine comprising at least one propeller having a longitudinal axis of rotation, a gas turbine engine having a longitudinal axis of rotation offset from the axis, and a reduction gear by means of which said propeller receives drive power from said engine, wherein the propeller and the gas turbine engine are designed such that axes and are offset from one another within said cradle at least by a given value in a transverse direction, the axis of the gas turbine engine being transversely closer to a proximal lateral side of the cradle than to an opposite distal lateral side of the cradle in order to create a lateral space between said engine and said distal lateral side of the cradle, thereby forming at least one region for installing equipments, components or accessories of said turbine engine.

11 Claims, 3 Drawing Sheets

(51) Int. Cl.
  *B64D 27/12* (2006.01)
  *B64D 29/08* (2006.01)
  *F02C 7/04* (2006.01)
  *F02C 7/20* (2006.01)
  *F02C 7/32* (2006.01)
  *F02C 7/36* (2006.01)

(52) U.S. Cl.
  CPC .................. *F02C 7/04* (2013.01); *F02C 7/20* (2013.01); *F02C 7/32* (2013.01); *F02C 7/36* (2013.01); *B64D 2027/264* (2013.01); *F05D 2220/323* (2013.01); *F05D 2250/312* (2013.01); *F05D 2260/15* (2013.01); *F05D 2260/40* (2013.01); *F05D 2260/4031* (2013.01); *Y02T 50/671* (2013.01)

(58) Field of Classification Search
  CPC .......... F02C 7/36; F02C 7/04; F05D 2260/15; F05D 2220/323; F05D 2260/40
  See application file for complete search history.

(56) References Cited

U.S. PATENT DOCUMENTS

| | | | | |
|---|---|---|---|---|
| 2009/0056309 A1* | 3/2009 | Roberge | ................ | F02C 3/113 60/263 |
| 2011/0314788 A1* | 12/2011 | Marche | ................ | B64D 27/16 60/39.01 |
| 2014/0130512 A1* | 5/2014 | Chouard | ................ | B64D 27/14 60/797 |
| 2015/0075177 A1* | 3/2015 | Natal | ................ | F16M 1/04 60/797 |
| 2017/0313431 A1* | 11/2017 | Florent | ................ | B64D 27/10 |

* cited by examiner

TURBINE ENGINE HAVING HORIZONTALLY OFFSET AXES

TECHNICAL FIELD OF THE INVENTION

The present invention relates to attaching power plants to aircraft. More particularly, it relates to fastening or suspending a turbine engine having propellers in the form of a turboprop engine below an aircraft wing by means of a cradle attached to the wing.

PRIOR ART

Turboprop aircraft propulsion assemblies or unducted fan assemblies of the "open rotor" type typically comprise a cradle that is suspended from the aircraft wing and receives a single turbine engine, i.e. a gas turbine turbocompressor engine, installed at least in part within said cradle. The cradle has to satisfy various criteria, in particular aerodynamic and mechanical criteria.

Such a cradle is located within an air flow when the aircraft is moving, and in particular within the air stream produced by the propeller driven by said turbine engine. For this reason, the cradle has to take up as little space as possible around the turbine engine so as to minimise the impact it creates as an obstacle in the air flows, whether the air flows are those caused by the movement of the aircraft or those caused by the propeller of said turbine engine.

Such a cradle also has to allow the static and dynamic forces caused by the turbine engine, such as weight, thrust and the absorption of the turboprop engine torque, or more generally the different dynamic forces to which the turbine engine subjects the wing during operation, to be transmitted to the wing. To do so, the cradle has to have high rigidity properties.

Furthermore, such a cradle has to provide different spaces for housing different components, accessories or equipments for the operation of the turbine engine.

In the case of a turboprop engine, for example, such a cradle has to be able to house an air intake duct to allow fresh air to be supplied to the gas turbine engine of the turboprop engine, and a conduit connected to said air intake duct for ridding the intake air of any impurities and/or foreign matter it may contain to prevent these entering the gas turbine engine of the turboprop engine.

The cradle also has to house various equipments, components or accessories of the turboprop engine, such as computers, hardware and an accessory gear box (AGB), comprising in particular an alternator and a turboprop starter motor.

FIG. 1 shows a propulsion assembly 10 according to the prior art, comprising a turbine engine formed in this case (by way of example and in a manner not limiting to the invention) by a turboprop engine 12 carried by a cradle 14, said cradle 14 being attached below a wing 16 of an aircraft. The cradle 14 comprises, for example, three inverted-U-shaped arches 18, 20, 22—a front, middle and rear arch—open at their lower ends and interconnected by means of a mesh of connecting rods 24. In front of the cradle 14, the turboprop engine 12 comprises a reduction gear 26 that has an axis A parallel to a longitudinal direction X, is attached for example to the front arch 18 and drives a hub 29 of a propeller 28. The reduction gear 26 is coupled to the gas turbine engine 30, which has an axis B, parallel to axis A, by means of a shaft 38 from which it receives a drive power that it transmits to the propeller 28.

The cradle 14 covers the gas turbine engine 30 while leaving its lower part relatively free, for maintenance or removal purposes.

In its lower part, the cradle 14 receives an air intake duct 32, of which an intake 34 can be seen, located behind the propeller 28 of the turboprop engine 12. The air intake duct 32 extends longitudinally at least in part below the turboprop engine 12, and the shaft 38 passes therethrough and extends as far as to the reduction gear 26. A nozzle 40 of the gas turbine engine 30 is carried at least by the rear arch 22 of the cradle 14.

The turboprop engine 12 comprises various accessories, equipments or components. For example, the turboprop engine 12 comprises computers 42, hardware 44 and an accessory gear box or AGB 46, which are arranged in an upper, free region 48 of the cradle 14 located above the gas turbine engine 30. Specifically, the AGB 46 is arranged above the gas turbine engine 30.

According to this design, the air intake duct 32, which is necessary for the turboprop engine 12 to function, extends below the gas turbine engine 30. This duct 32 reduces the space available for installing other equipments, components or accessories below the turboprop engine 12.

As a result, the computers 42, hardware 44 and AGB 46 are moved into an upper region 48 of the cradle 14.

FIG. 2 specifically shows the location of the axes A, B of the propeller 28 and of the gas turbine engine 30. According to this figure, the axis A of the propeller 28 at the output of the reduction gear 26 is offset vertically above the axis B of the gas turbine engine 30, i.e. in the vertical direction "Z" of a directional trihedral shown in FIG. 2. The computers 42, hardware 44 and AGB 46 are arranged substantially above the gas turbine engine 30 in the aforementioned region 48. Other accessories or equipments (not shown in FIG. 2) can also be located there.

However, this location of the computers 42, hardware 44 or AGB 46 is not optimal because they are located in a high-temperature region of the turbine engine 12, since the air heated by the gas turbine engine 30 during operation tends to move vertically and be restricted to the upper region 48 of the cradle 14 by a nacelle 50 of the aircraft covering the cradle 14, even though it would be preferable for these elements to be placed in a portion of the cradle where they would not be exposed to a rising hot air flow and where they would thus be more easily cooled.

Another significant disadvantage of this design is that arranging the air intake duct 32 and the gas turbine engine 30 above one another makes it more difficult to maintain the computers 42 and hardware 44 of the turbine engine 12. Indeed, these elements are accessible through "beetle-wing" cowls located in an upper portion of the nacelle 50, the opening of which is restricted by the wing 16. As a result, they can only be accessed from the side, in a particularly difficult manner.

Therefore, there is a need for a different location of the turbine engine 12 within the cradle 14, in order to position the computers, accessories and equipments 42, 44, 46 of the turbine engine 12 in a position that helps them be cooled and makes access to them easier.

Documents US-2009/056309-A1 and U.S. Pat. No. 2,601,194-A describe ducted fan turbojet engine propulsion assemblies. The propulsion assemblies of this type do not generally have a cradle since the turbine engines are attached to a strut or mast of the aeroplane by means of suspensions that do not require a rigid structure such as a cradle around the engine in order to support the engine. The nacelles around these turbine engines are carried by the engines and thus do not perform any role of supporting a turbine engine.

The propulsion assemblies described in the aforementioned documents comprise a plurality of gas turbine engines housed within the same nacelle, some of which are offset transversely and horizontally from the propeller axis. This design based on a plurality of gas turbine engines housed within the same nacelle does not apply to a propulsion assembly comprising a single turboprop-like turbine engine received in a cradle.

DISCLOSURE OF THE INVENTION

The invention overcomes the above-mentioned drawbacks by proposing a new propulsion assembly design that allows to insert said elements laterally.

To this end, the invention provides an aircraft propulsion assembly comprising a cradle and a turbine engine installed in part within said cradle, said turbine engine comprising at least one propeller having a longitudinal axis of rotation parallel to a longitudinal direction, a gas turbine engine having a longitudinal axis of rotation offset from the axis of said propeller, and a reduction gear by means of which said propeller receives drive power from said engine, characterised in that the propeller and the gas turbine engine are designed such that their axes are offset from one another within said cradle at least by a given value in a horizontal transverse direction perpendicular to a vertical direction and to the longitudinal direction, the axis of the gas turbine engine being closer to a proximal lateral side of the cradle than to the opposite distal lateral side of the cradle in the transverse direction in such a way as to create a lateral space between said gas turbine engine and said distal lateral side of the cradle, said lateral space forming at least one region for installing equipments, components or accessories of said turbine engine.

This configuration allows to free up a region within the cradle for installing accessories and equipments s, said region being arranged laterally with respect to the gas turbine engine. This region, which is not located within the heat flow emitted by the gas turbine engine, is particularly advantageous for installing turbine engine accessories and equipments s while avoiding exposing them to extreme heat.

According to other features of the invention:
- the reduction gear comprises an input shaft coaxial with the axis B of the engine, and at least one output shaft coaxial with the axis A of said at least one propeller, and the input and output shafts of the reduction gear are designed to be offset at least in the horizontal transverse direction within said cradle,
- the cradle comprises a substantially symmetrical front arch having a plane of symmetry located halfway between two uprights of the front arch, the axis A of said propeller extending within said plane of symmetry, and the given value of the offset in the horizontal transverse direction between the axis B of the engine and said plane of symmetry is strictly less than that of a distance between said axis B of the engine and a proximal lateral upright of the front arch located on the same side as said axis B of the engine in relation to the plane of symmetry,
- the value of the offset in the horizontal transverse direction between the axis of the engine and said plane of symmetry is less than half the value of the distance between the axis B of the engine and the proximal lateral upright of the front arch,
- the turbine engine comprises at least one upstream propeller and an air intake duct that feeds air to the engine and comprises at least:
  - a first portion which is connected to said engine and of which the axis C is designed to be positioned in the cradle vertically above the axis B of said engine,
  - a second portion forming an intake, one end of which opens behind said at least one upstream propeller and which is oriented along an axis D which, together with the axis C of the first portion, forms an angle that is substantially identical to an angle, referred to as the sideslip angle, that corresponds to the angle formed between the axis A of said at least one upstream propeller and a flow direction of the gases driven by said at least one upstream propeller,
- the turbine engine comprises an exhaust pipe that comprises at least a first portion which is connected to the engine and of which the axis E is designed to be positioned within the cradle vertically above the axis B of the engine, and a second outlet portion which is oriented along an axis F designed to be positioned within the cradle vertically above the axis A of said at least one propeller,
- the equipments, components or accessories are attached laterally to the engine, opposite said distal lateral side of the cradle,
- the equipments, components or accessories comprise at least one accessory gear box and a single pump for feeding oil to said gear box,
- the propulsion assembly comprises a nacelle which covers said cradle and of which just one cowl provides access to said installation region,
- said at least one propeller subjects said turbine engine to a given torque oriented in a rotational direction of said at least one propeller, and the axis B of the engine is offset transversely from a given side of the axis A of said at least one propeller such as to apply a torque to the turbine engine that is capable of opposing at least part of said torque applied by said at least one propeller,
- the propulsion assembly comprises at least one device for absorbing the torque applied by said at least one propeller, which device is located between said turbine engine and said cradle, and the size of said torque absorption device is determined depending on said torque applied by said at least one propeller and on the opposite torque applied by the engine, said torque applied by the engine being dependent on the weight of the engine and on the offset of its axis B from the axis A of said at least one propeller.

Finally, the invention relates to an aircraft according to any of the preceding claims, comprising at least two identical propulsion assemblies arranged on either side of a median axis of said aircraft.

DESCRIPTION OF THE FIGURES

The present invention will be better understood, and other details, features and advantages of the present invention will become clearer, from the description of the following non-limiting example, given with reference to the accompanying drawings, in which.

DETAILED DESCRIPTION

Figure 1:
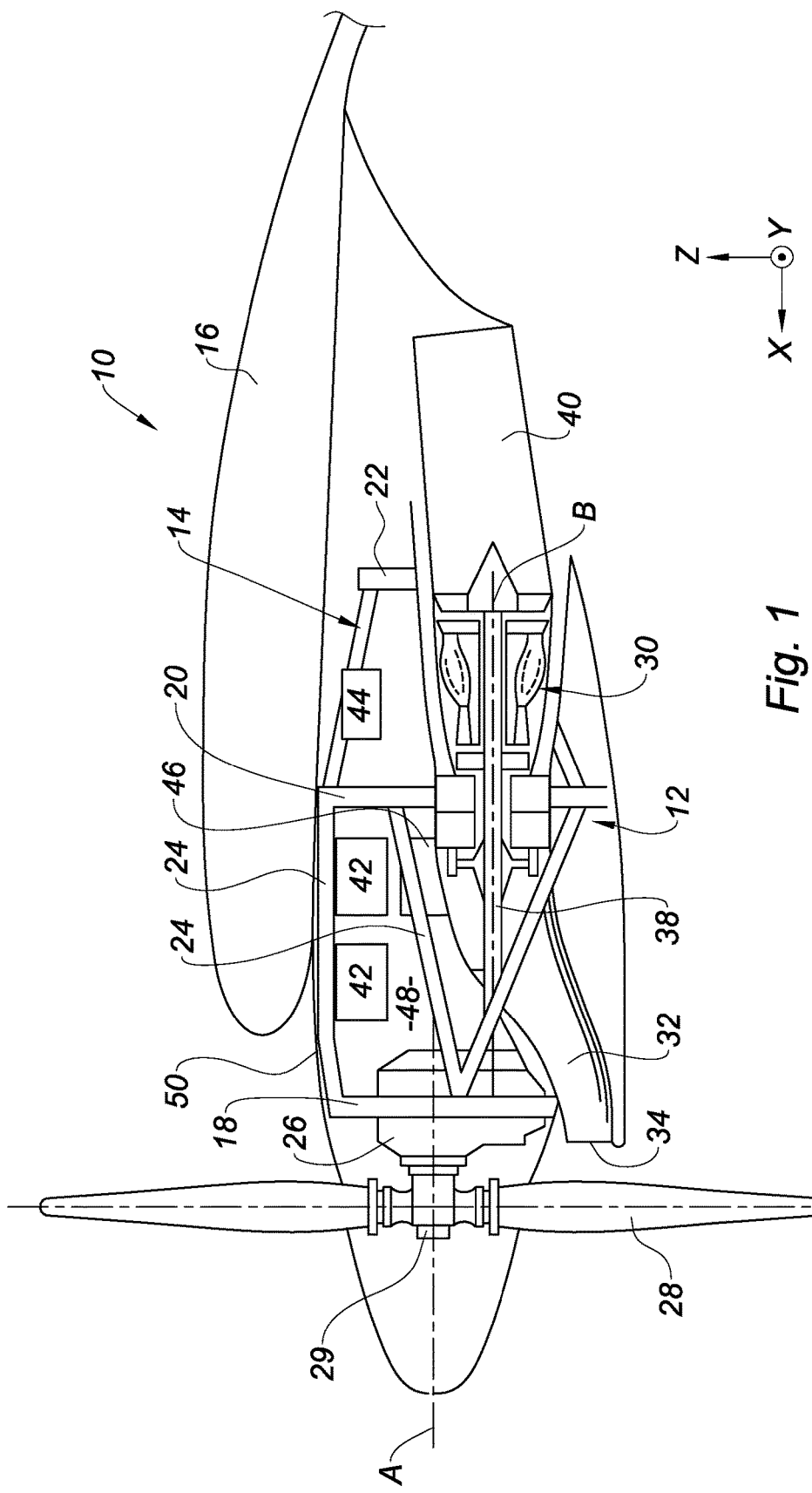
FIG. 1 (already discussed) is a sectional view of a cradle according to the prior art, attached below an aircraft wing and receiving a turboprop engine.

In the following description, identical reference numerals designate identical parts or those with similar functions.

In the following description, the descriptions "longitudinal", "horizontal" or "lateral", and "vertical" relate to the orientation of the turbine engine in relation to a trihedral X, Y, Z, the X axis of which corresponds to the longitudinal direction of the turbine engine, the Y axis of which corresponds to the horizontal direction and/or lateral orientation, and the Z axis of which corresponds to the vertical direction.

Figure 4:
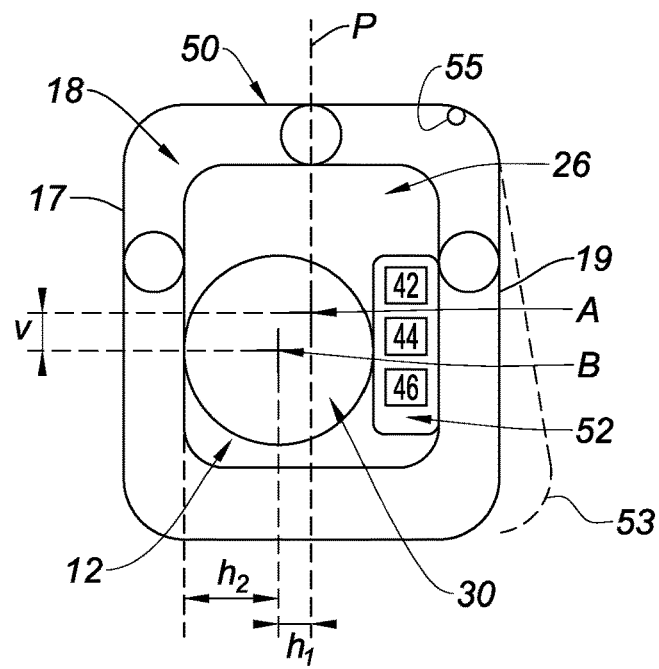
FIG. 4 is a schematic sectional view, through a transverse plane, of a cradle and a turboprop engine received in said cradle, designed according to the invention.
Figure 5:
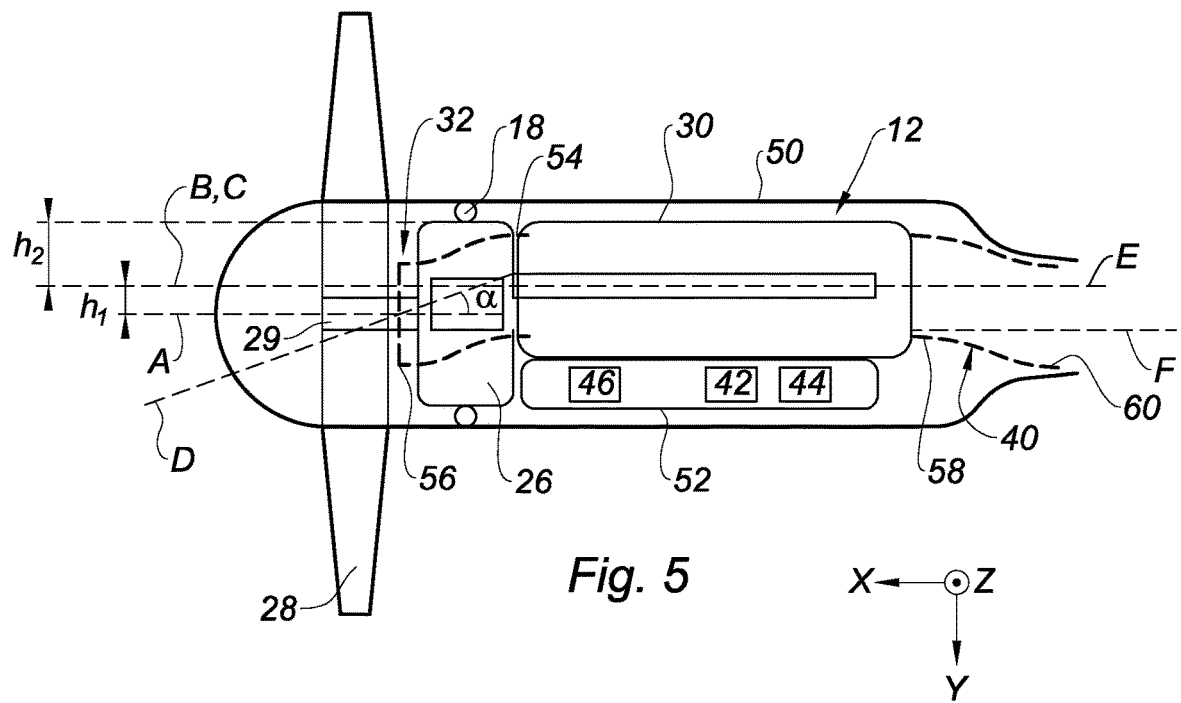
FIG. 5 is a schematic plan view of a cradle and a turboprop engine received in said cradle, designed according to the invention.
Figure 6:
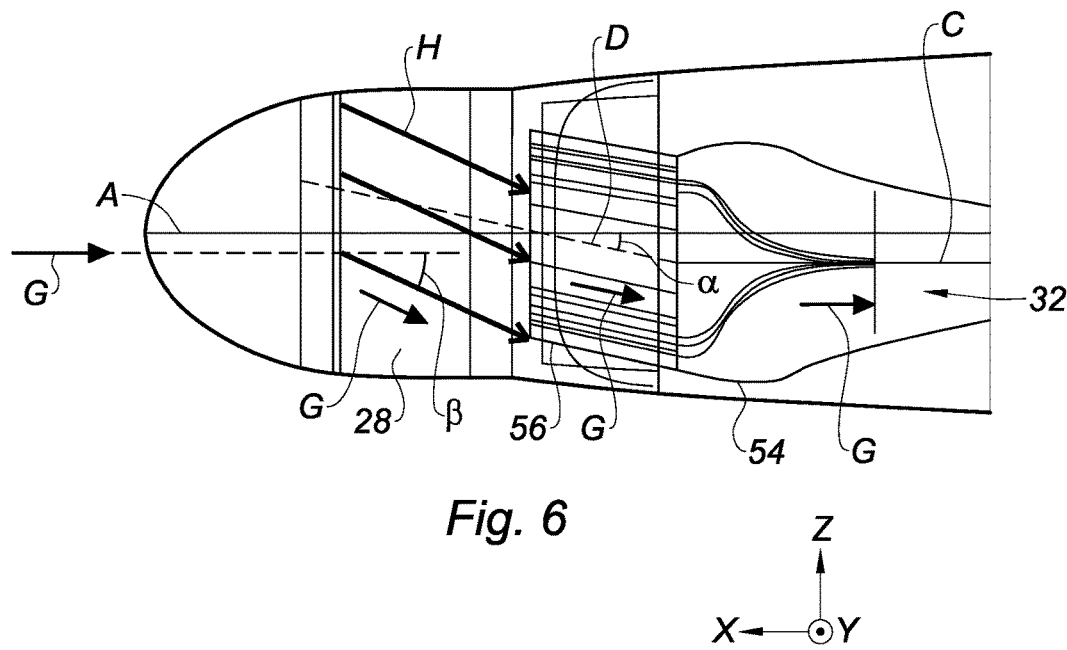
FIG. 6 is a detailed view from below of the turboprop engine from FIG. 5 and its air intake duct.

An aircraft propulsion assembly 10 according to the invention, as shown in FIGS. 4 and 5, has similarities with the propulsion assembly 10 described above in relation to the prior art. FIGS. 4 to 6 show a propulsion assembly 10 comprising a turbine engine 12 consisting of a turboprop engine comprising a propeller 28 positioned upstream in the air flow direction, but it should be noted that the invention being described can be applied to any type of unducted propeller turbine engine of the turboprop engine type.

As with the turbine engine 12 described above, the turbine engine 12 according to the invention also comprises at least one propeller 28 having an axis of rotation A, a reduction gear 26, and a gas turbine engine 30 having a longitudinal axis of rotation B parallel to the axis A. The axis B of the engine 30 is also offset from the axis A of the propeller 28 in a transverse plane.

Like the turbine engine 12 according to the prior art, the propeller 28 receives drive power from the engine 30 by means of the reduction gear 26. Since this is a turbine engine 12 comprising just one propeller 28, the reduction gear 26 comprises one single input connected to the shaft 38 and one single output connected to a hub 29 of the propeller 28 so as to be coaxial therewith. It should be noted that, if the invention were applied to a turbine engine comprising a pair of contra-rotating propellers, the reduction gear 26 would comprise one input and two outputs, each of these outputs driving one of the propellers of the pair. In this case, and as is known, the reduction gear 26 could be an epicyclic reduction gear, the planetary gears, planet carrier and ring gear of which would be connected to the input and the two outputs of the reduction gear, respectively.

The reduction gear 26 and the gas turbine engine 30 are designed to be received and attached in a distinct manner in the cradle 14, which able to carry them, in other words regardless of their transverse offset from the centre of the turbine engine 12, i.e. regardless of the transverse distance between their axes of rotation A and B; the reduction gear 26 and the engine 30 of the propulsion assembly 10 are designed to occupy one given position within the cradle 14, this position being determined by attachment points (not shown) of the reduction gear 26 and/or of the engine 30 with respect to the cradle 14.

Normally, as shown in FIG. 5, the propeller 28 and the gas turbine engine 30 are designed to be arranged in a single distinct position with respect to the cradle 14 carrying the engine 30 and the reduction gear 26. Indeed, the position of the reduction gear 26 in relation to the cradle 14 is determined by the front arch 18 to which the reduction gear 26 is attached. The position of the axis A of the propeller 28 is determined in a distinct manner with respect to the reduction gear 26 since, in the case of the turboprop engine 12 shown in FIG. 5, the axis A of the propeller 28 is coaxial with an output shaft of the reduction gear 26. Likewise, the position of the axis B of the gas turbine engine 30 with respect to the reduction gear 26 is also determined in a distinct manner with respect to the reduction gear 26 by the centre line formed between the axes A and B, since the axis A is designed to be coaxial with an input shaft of the reduction gear 26. As a result, the position of the axis B of the gas turbine engine 30 is thus determined in a distinct manner with respect to the cradle 14, since the position of the reduction gear 26 with respect to the cradle 14 is defined by the attachments of the reduction gear 26 to the cradle 14.

The position of the gas turbine engine 30 about its axis B can, for its part, be defined in various different ways. The position of the gas turbine engine 30 can be defined by points (not shown) for attachment to the cradle 14, such as attachment points arranged between the nozzle 40 at the rear arch 22 of the cradle 14, and/or by points for attaching the gas turbine engine 30 to the reduction gear 26, when these two elements are attached to each other, as is often the case in this type of turboprop engine.

According to the invention, as shown by FIGS. 4 and 5, the propeller 28 and the engine 30 are designed so that their axes A and B are offset from one another in the transverse plane perpendicular to the axis A by a given value $h_1$ at least in the horizontal transverse direction Y within the cradle 14.

In the embodiment shown in FIG. 4, the axis A of the propeller 28 and the axis B of the gas turbine engine 30 are preferably offset not only by a value $h_1$ in the horizontal transverse direction Y, but also by a value v in the vertical direction Z. It should be noted that the latter configuration does not limit the invention, and that the offset of the axis A of the propeller 28 and the axis B of the gas turbine engine 30 could be arranged in the horizontal direction Y only.

This configuration is particularly advantageous since the axis B of the gas turbine engine 30 is thus closer, in the transverse direction Y, to a proximal lateral side of the cradle (associated with an upright 17) than to an opposite distal lateral side of the cradle (corresponding to an opposite upright 19). This thus creates a region 52 for installing equipments and accessories of the turboprop engine 12, which can be arranged laterally with respect to the gas turbine engine 30.

This region 52 for installing equipments and accessories is advantageous in that it is not exposed to a rising hot air flow emitted by the gas turbine engine 30, meaning the reliability of the components within this region, such as computers 42 and hardware 44, can be significantly increased. This configuration is particularly advantageous as regards all the electronic equipments, which is particularly sensitive to high temperatures and for which optimum cooling or at least an environment with low temperatures is essential.

Preferably, the accessories such as the computers 42, the hardware 44 or the AGB 46 are attached laterally to the engine 30, opposite said distal lateral side of the cradle 14 associated with the upright 19. However, this configuration does not limit the invention; it should be noted that the computers 42, the hardware 44 or the AGB 46 cannot be directly attached to the engine 30 as long as they are arranged in the installation region 52, i.e. laterally with respect to the engine 30 and on the side of the axis A of the propeller 28, as can be seen in FIG. 4.

Advantageously, since the computers 42, hardware 44 or AGB 46 are attached laterally with respect to the engine 30, the propulsion assembly 10 can comprise a nacelle 50 covering said cradle 14, of which just one cowl provides access to said installation region 52. FIG. 4 shows, in a schematic manner and by means of a dotted line, such a cowl 53, hinged to the nacelle 50 by means of a pivot pin 55.

This lateral configuration is particularly advantageous as regards the accessory gear box 46. Indeed, in a typical configuration as shown in FIG. 1, the AGB 46 is attached above the gas turbine engine 30, as mentioned. In addition, and as is known, this gear box 46 comprises an oil sump containing lubricating oil for lubricating the internal gears of said AGB 46.

When the aircraft is in flight, the accessory gear box 46 must be able to be lubricated no matter how the aircraft is tilted. Indeed, it is necessary for all the gears inside the AGB 46 to be lubricated regardless of the tilt of the aircraft. To do so, the AGB 46 has two feed pumps, each for pumping the oil on one side within the casing of the AGB 46 in order to compensate for a lack of oil supply on one side of the gear box when the tilt of the aircraft leads to a lack of oil on the side in question.

The benefit of the configuration according to the invention is that it allows to reduce the number of oil pumps used in the AGB 46. Indeed, since the AGB 46 is arranged laterally with respect to the gas turbine engine 30, as shown in FIG. 4, the oil level within the casing of the AGB 46 only needs pumping when the aircraft is tilted towards the opposite side to the installation region 52. Conversely, the oil is held by gravity in the casing of the AGB 46 when the aircraft is tilted towards the side of the installation region 52. As a result, in order to maintain a satisfactory oil level within the casing of the AGB 46, it is sufficient to have just one oil feed pump, actuated when the aircraft is tilted towards a side opposite to the installation region 52.

In practice, the offset of value $h_1$, in the horizontal direction Y, of the axis A of the propeller 28 from the axis B of the gas turbine engine 30 is produced by means of the reduction gear 26.

Indeed, the reduction gear 26 comprises, as mentioned, an input shaft (not shown in FIGS. 4 and 5) which is driven by the shaft 38 and is coaxial with the axis B of the engine 30 and with at least one output shaft (not shown in FIGS. 4 and 5) which is coaxial with the axis A of the propeller 28. The input and output shafts of the reduction gear 26 are designed to be offset at least in the horizontal transverse direction within the cradle 14, by a value identical to the value $h_1$ of the offset in the horizontal direction Y. In practice, this configuration is produced by the offset between the input and output shafts of the reduction gear 26 and by the position of the attachment points (not shown) of the reduction gear 26 with respect to the cradle 14.

It should be noted that, in the embodiment shown in FIGS. 4 and 5, the input and output shafts of the reduction gear 26 are also offset by a value corresponding to the value v of the offset in the vertical direction Z.

In the preferred embodiment of the invention, the front arch 18 is substantially symmetrical and has a plane of symmetry P located halfway between the two lateral uprights 17, 19 of the front arch 18. The axis A of the propeller 28 extends within the plane of symmetry P. The value $h_1$ of the offset in the horizontal transverse direction Y between the axis B of the engine 30 and the plane of symmetry P is strictly less than a value of a distance $h_2$ between said axis B of the engine and the proximal lateral upright 17 of the front arch 18 located on the same side as said axis B of the engine in relation to the plane of symmetry P.

Even more preferably, the value $h_1$ of the offset in the horizontal transverse direction Y between the axis B of the engine 30 and the plane of symmetry P is less than half the value of the distance $h_2$ between the axis B of the engine and the proximal lateral upright 17 of the front arch 18. This configuration means that the overall weight balance around the attachment points of the cradle to the aircraft wing only needs adjusting very slightly.

Another advantage of the invention is that it makes it allows to take advantage of the horizontal offset of the value $h_1$ of the axis B of the gas turbine engine 30 with respect to the axis A of the propeller 28 in order to improve the flow of air within the air intake duct 32, as part of a propulsion assembly equipped with a turboprop engine comprising a single propeller 28 arranged upstream of the turboprop engine in the gas flow direction.

Figure 2:
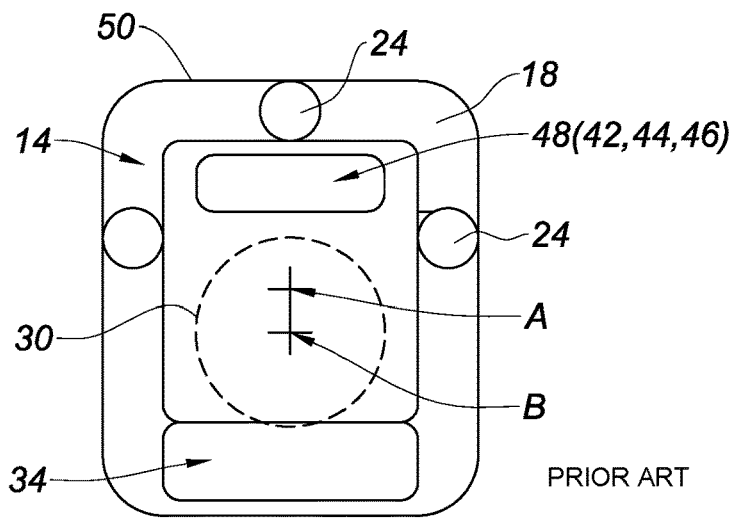
FIG. 2 (already discussed) is a schematic sectional view, through a transverse plane, of the cradle and the turboprop engine of FIG. 1.
Figure 3:
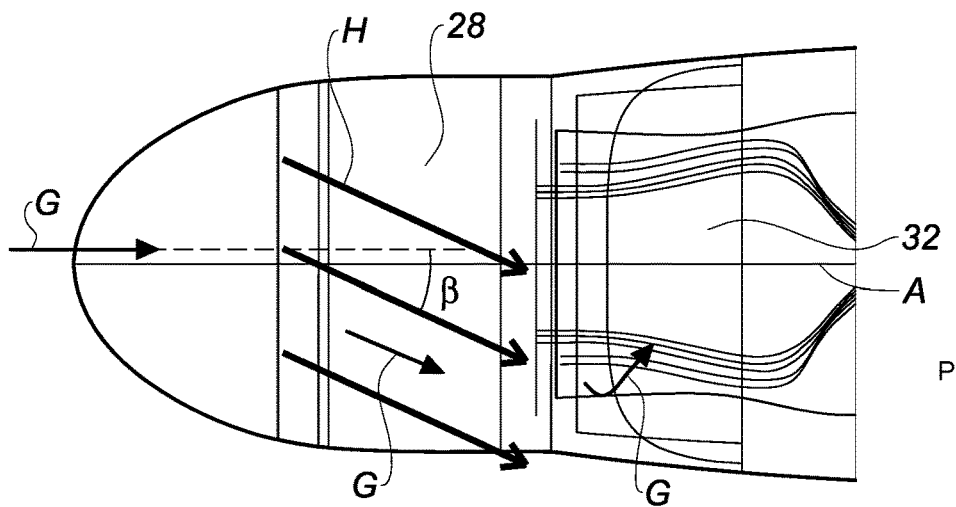
FIG. 3 is a detailed view from below of the turboprop engine from FIG. 1 and its air intake duct.

In the prior art shown in FIGS. 1 to 3 and in the preferred embodiment of the invention shown in FIGS. 5 and 6, an air intake duct 32 is shown arranged below the turboprop engine 12. This configuration is of course not limiting to the invention, and the features of the air intake duct to be described below can also be applied to an air intake duct arranged above the turboprop engine 12.

As is known, and as shown in FIG. 5, the air intake duct 32 comprises a first portion 54 that is connected to the gas turbine engine 30 and of which the axis C is designed to be positioned within the cradle vertically above the axis B of said engine.

In a conventional configuration according to the prior art, the air intake duct 32 has a single axis positioned above the axis A of the propeller 28 and the axis B of the gas turbine engine 30.

According to the invention, the air intake duct 32 comprises a second portion 56 forming an intake, one end of which opens behind said at least one upstream propeller 28 and which is oriented along an axis D that forms an angle α with the axis C of the first portion 54. This configuration allows to still have a nacelle 50 of the same shape as a conventional nacelle 50, i.e. having an intake 56 aligned coaxially with the axis of said nacelle 50.

Advantageously, the angle α is designed to be substantially identical to an angle, referred to as the sideslip angle, of the propeller 28.

The sideslip angle is a well-known feature of a propeller and consists of an angle β formed between the axis A of said propeller 28, corresponding to a direction in which the gases G enter, and a flow direction H of the gases G driven by said propeller 28. In a conventional configuration like that of the turboprop engine 12 in FIG. 3, the gases mixed by the propeller 28 enter the air intake duct 32 at the angle β, causing the flow of these gases G to be disrupted, which hinders the supply to the gas turbine engine 30.

Conversely, in the case of the invention, the angle α formed by the axis D of the second portion 56 of the air intake duct 32 with the axis A of the propeller 28, corresponding to said angle β, ensures the gases G mixed by the propeller 28 enter the air intake duct 32 in an optimum manner. The gases G are then rectified by the first portion 54 of the air intake duct 32 before being fed into the gas turbine engine 30.

As mentioned, one advantageous feature of the nacelle 50 of the propulsion assembly 10 is that the nacelle 50 is similar in size to the nacelle 50 described above in relation to the prior art.

For this purpose, the turboprop engine 12 comprises an exhaust pipe 40 for rectifying the flow of exhaust gases in such a way that said flow exits coaxially with the axis of the nacelle 50.

To this end, the exhaust pipe 40 comprises portions having different axes, similarly to the air intake duct 32. In particular, as shown in FIG. 5, the exhaust pipe 40 comprises at least one first portion 58, which is connected to the gas turbine engine 30 and of which the axis E is designed to be positioned within the cradle 14 vertically above the axis B of the engine 30, and a second outlet portion 60, which is oriented along an axis F designed to be positioned within the cradle vertically above the axis A of the propeller 28.

As well as allowing to achieve a turboprop engine of which the axes of the propeller 28 and of the engine 30 are horizontally offset, this configuration also makes it possible to retain a nacelle 50 of which the air intake duct 32 and the nozzle 40 retain inlets and outlets vertically aligned with the axis A of the propeller 28. Therefore, a propulsion assembly 10 comprising a nacelle 50 of this kind is symmetrical in relation to the axis of the nacelle 50. It can thus be placed anywhere beneath the wing of an aircraft, without having to take account of the horizontal offset side of the gas turbine engine 30. An aircraft comprising such propulsion assemblies 10 can thus comprise at least two identical propulsion assemblies arranged on either side of a median axis of said aircraft.

In addition, as regards the conventional configuration of a propulsion assembly 10 as shown in FIG. 1, it should be noted that the propulsion assembly 10 according to the invention exerts a static torque applied by the weight of the gas turbine engine 30 to the cradle 14, owing to the transverse offset of value $h_1$ between the axis A of the propeller 28 at the output of the reduction gear and the axis B of the gas turbine engine 30, and owing to the weight of the gas turbine engine 30.

This torque can be utilised advantageously to oppose at least part of the torque applied by the propeller 26 to the cradle 14 during operation.

Indeed, during operation, the propeller 28 subjects the turboprop engine 12 to a given torque oriented in a rotational direction of said propeller, said torque being transmitted to the cradle 14 by means of the reduction gear 26. In a conventional configuration, the propulsion assembly 10 comprises a torque absorption device (not shown in the drawings) intended for opposing said torque. Advantageously, the invention allows the size of this device to be determined depending on the weight of the engine 30 and on the offset of its axis B from the axis A of the propeller 28.

Indeed, by carefully selecting the rotational direction of the propeller 28 in relation to the orientation of the offset of the gas turbine engine 30, the static torque applied by the gas turbine engine 30 to the reduction gear 26 (owing to the weight of the engine and to the values $h_1$ and v of its offset in the horizontal direction Y and vertical direction Z, respectively) can be utilised to oppose at least part of the torque applied by the propeller 28, and to thus be able to make the torque absorption device smaller.

It should thus be noted that, when determining the size of the propulsion assembly 10, it is desirable to take account of the value of the torque likely to be applied by the propeller 28 and its rotational direction, and of the static torque that the gas turbine engine 30 can apply counter thereto, in order to give the torque absorption device the optimum and most appropriate size.

It should also be noted that, in this configuration, the static torque applied by the gas turbine engine 30 is opposite to the torque produced by the propeller 28 and is not added thereto.

Therefore, the size of the torque absorption device can be dependent on the torque applied by said at least one propeller 28 and on the opposite static torque applied by the engine 30, the latter torque in turn being dependent on the weight of the engine and the values $h_1$ and v of its offset in the horizontal direction Y and vertical direction Z of its axis B from the axis A of the propeller 28.

By means of the invention, therefore, the installation, environment and accessibility of the accessories and equipments of a turbine engine 12 can be significantly optimised, without any significant impact on the shape of the cradle 14 that receives the turbine engine or therefore on the shape of the nacelle 50 that covers the cradle, and without particularly affecting the configuration of the aircraft fitted with the turbine engine.

The invention claimed is:

1. Aircraft propulsion assembly comprising a cradle and a turbine engine installed in part in said cradle, said turbine engine comprising at least one propeller having a longitudinal axis of rotation parallel to a longitudinal direction, a gas turbine engine having a longitudinal axis of rotation offset from the axis of said propeller, and a reduction gear by means of which said propeller receives drive power from said engine, wherein the propeller and the gas turbine engine are designed such that their axes and are offset from one another within said cradle at least by a given value in a horizontal transverse direction perpendicular to both a vertical direction and the longitudinal direction, the axis of the gas turbine engine being closer to a proximal lateral side of the cradle than to an opposite distal lateral side of the cradle in the transverse direction in such a way as to create a lateral space between said gas turbine engine and said distal lateral side of the cradle said lateral space forming at least one region for installing equipments components or accessories of said turbine engine.

2. Aircraft propulsion assembly according to claim 1, wherein the reduction gear comprises an input shaft coaxial with the axis of the engine, and at least one output shaft coaxial with the axis of said at least one propeller, and in that the input and output shafts of the reduction gear are designed to be offset at least in the horizontal transverse direction within said cradle.

3. Propulsion assembly according to claim 1, wherein the cradle comprises a substantially symmetrical front arch having a plane of symmetry located halfway between two lateral uprights of the front arch, the axis of said propeller extending within said plane of symmetry, and in that the given value of the offset in the horizontal transverse direction between the axis of the engine and said plane of symmetry is strictly less than a value of a distance between said axis of the engine and a proximal lateral upright of the front arch located on the same side as said axis of the engine in relation to the plane of symmetry.

4. Propulsion assembly according to claim 3, wherein the value of the offset in the horizontal transverse direction between the axis of the engine and said plane of symmetry is less than half the value of the distance between the axis of the engine and the proximal lateral upright of the front arch.

5. Aircraft propulsion assembly according to claim 1, wherein the turbine engine comprises at least one upstream propeller and in that it comprises an air intake conduit that feeds air to the engine and comprises at least:

a first portion which is connected to said engine and of which the axis is designed to be positioned within the cradle vertically above the axis of said engine, a second portion forming an intake, one end of which opens behind said at least one upstream propeller and which is oriented along an axis which, together with the axis of the first portion, forms an angle ($\alpha$) that is substantially identical to an angle ($\beta$), referred to as the sideslip angle, that corresponds to the angle formed between the axis of said at least one upstream propeller and a flow direction of the gases driven by said at least one upstream propeller.

6. Propulsion assembly according to claim 1, wherein the turbine engine comprises an exhaust pipe that comprises at least a first portion which is connected to the engine and the axis of which is designed to be positioned within the cradle vertically above the axis of the engine, and a second outlet portion which is oriented along an axis designed to be positioned within the cradle vertically above the axis of said at least one propeller.

7. Propulsion assembly according to claim 1, wherein the equipments, components or accessories are attached laterally to the engine, opposite said distal lateral side of the cradle.

8. Propulsion assembly according to claim 7, wherein the equipments, components or accessories comprise at least one accessory gear box and a single pump for feeding oil to said gear box.

9. Propulsion assembly according to claim 1, comprising a nacelle which covers said cradle and of which just one cowl provides access to said installation region.

10. Propulsion assembly according to claim 1, wherein said at least one propeller subjects said turbine engine to a given torque oriented in a rotational direction of said at least one propeller, and in that the axis of the engine is offset transversely from a given side of the axis of said at least one propeller such that said engine applies a torque to the turbine engine that is capable of opposing at least part of said torque applied by said at least one propeller.

11. Propulsion assembly according to claim 10, comprising at least one device for absorbing the torque applied by said at least one propeller, which device is located between said turbine engine and said cradle, and in that the size of said torque absorption device is determined depending on said torque applied by said at least one propeller and on the opposite torque applied by the engine, said torque applied by the engine being dependent on the weight of the engine and on the offset of its axis from the axis of said at least one propeller.

* * * * *